United States Patent
Tripathi

(10) Patent No.: US 8,386,825 B2
(45) Date of Patent: *Feb. 26, 2013

(54) METHOD AND SYSTEM FOR POWER MANAGEMENT IN A VIRTUAL MACHINE ENVIRONMENT WITHOUT DISRUPTING NETWORK CONNECTIVITY

(75) Inventor: Sunay Tripathi, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,937

(22) Filed: Dec. 13, 2011

(65) Prior Publication Data

US 2012/0089981 A1   Apr. 12, 2012

Related U.S. Application Data

(63) Continuation of application No. 12/165,456, filed on Jun. 30, 2008, now Pat. No. 8,099,615.

(51) Int. Cl.
G06F 1/00 (2006.01)
G06F 9/455 (2006.01)
G06F 9/46 (2006.01)
(52) U.S. Cl. ............... 713/324; 718/1; 718/104
(58) Field of Classification Search .......... 713/300, 713/324
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,985,937 B1 * | 1/2006 | Keshav et al. | 709/223 |
| 7,046,665 B1 | 5/2006 | Walrand et al. | |
| 7,146,431 B2 * | 12/2006 | Hipp et al. | 709/238 |
| 7,177,311 B1 | 2/2007 | Hussain et al. | |
| 7,257,811 B2 * | 8/2007 | Hunt et al. | 718/1 |
| 7,260,102 B2 | 8/2007 | Mehrvar et al. | |
| 7,313,142 B2 | 12/2007 | Matsuo et al. | |
| 7,313,793 B2 * | 12/2007 | Traut et al. | 718/1 |
| 7,458,066 B2 | 11/2008 | Rhine | |

(Continued)

FOREIGN PATENT DOCUMENTS

WO   2005109195 A2   11/2005

OTHER PUBLICATIONS

Dovrolis, C., Thayer, B. and Ramanathan, P.: "HIP Hybrid Interrupt—Polling for the Network Interface", ACM SIGOPS Operating Systems Review, vol. 35, Iss. 4, Oct. 2001 (11 Pages).

(Continued)

*Primary Examiner* — Suresh Suryawanshi
(74) *Attorney, Agent, or Firm* — Osha • Liang LLP

(57) ABSTRACT

A method for power management. The method includes gathering resource usage data for a first blade and a second blade on a blade chassis, migrating each virtual machine (VM) executing on the first blade to the second blade based on the resource usage data and a first migration policy, wherein the first migration policy defines when to condense the number of blades operating on the blade chassis, and powering down the first blade after each VM executing on the first blade is migrated from the first blade.

8 Claims, 15 Drawing Sheets

U.S. PATENT DOCUMENTS

| | | | |
|---|---|---|---|
| 7,543,166 B2* | 6/2009 | Zimmer et al. | 713/310 |
| 7,590,683 B2 | 9/2009 | Bergen et al. | |
| 7,613,132 B2 | 11/2009 | Tripathi et al. | |
| 7,885,257 B2 | 2/2011 | Droux et al. | |
| 7,941,539 B2* | 5/2011 | Tripathi et al. | 709/226 |
| 7,962,587 B2* | 6/2011 | Tripathi | 709/222 |
| 7,984,123 B2* | 7/2011 | Tripathi et al. | 709/221 |
| 8,156,490 B2* | 4/2012 | Bozek et al. | 718/1 |
| 2002/0052972 A1 | 5/2002 | Yim | |
| 2003/0037154 A1 | 2/2003 | Poggio et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2005/0251802 A1* | 11/2005 | Bozek et al. | 718/1 |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0174324 A1 | 8/2006 | Zur et al. | |
| 2009/0172125 A1* | 7/2009 | Shekhar et al. | 709/215 |

OTHER PUBLICATIONS

Tripathi, S.; "Crossbow Architectural Document"; Nov. 21, 2006 (19 pages).

Droux, N.; "Crossbow: Network Virtualization and Bandwidth Partitioning"; presented at CHOSUG, Jun. 19, 2007 (23 pages).

Nordmark; E.; "IP Instances—Network Isolation Meets Zones"; presented at SVOSUG, Oct. 26, 2006 (28 pages).

Tripathi, S.; "CrossBow: Network Virtualization and Resource Control"; presented at SVOSUG, Aug. 24, 2006 (27 pages).

Tripathi, S.; "CrossBow: Network Virtualization and Resource Control"; presented at Sun Labs Open House; Jun. 1, 2006 (24 pages).

Tripathi, S.; "Solaris Networking—The Magic Revealed (Part I)"; Sunay Tripathi's Solaris Networking Weblog; Nov. 14, 2005; (22 Pages).

International Serach Report Issued in PCT/US2009/049003, Dated Sep. 3, 2009, (3 Pages).

VMware Incorporation, "VMware VirtualCenter User's Manual Version 1.0", http://www.vmware.com/pdf/VirtualCenter_Users_Manual.pdf, pp. 1-33, 139-154 and 287-295, Copyright 2003-2004, (58 Pages).

Written Opinion of the International Searching Authority issued in PCT/US2009/049003, Dated Sep. 3, 2009 (7 Pages).

Office Action in related Chinese Application No. 200980128632.3 mailed Sep. 18, 2012, with English translation (19 pages).

* cited by examiner

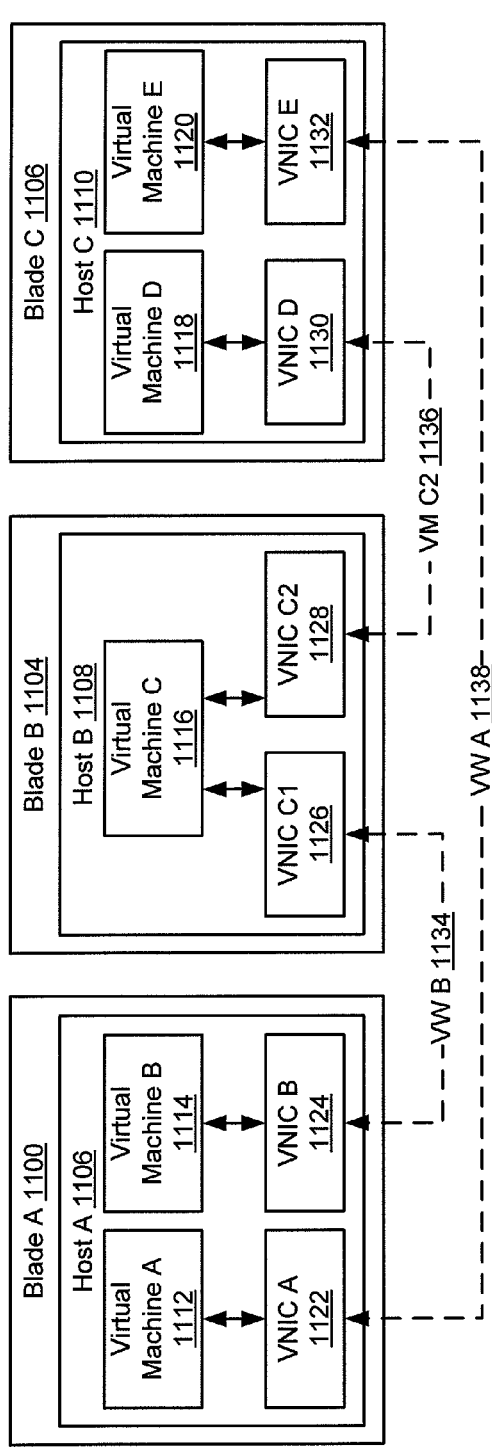
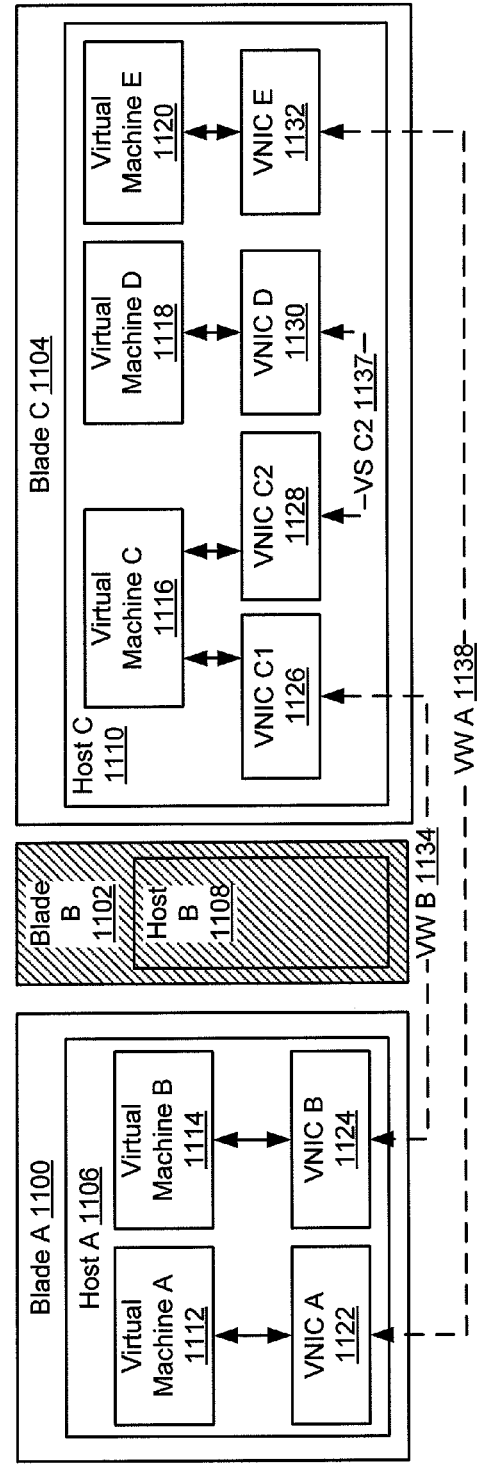

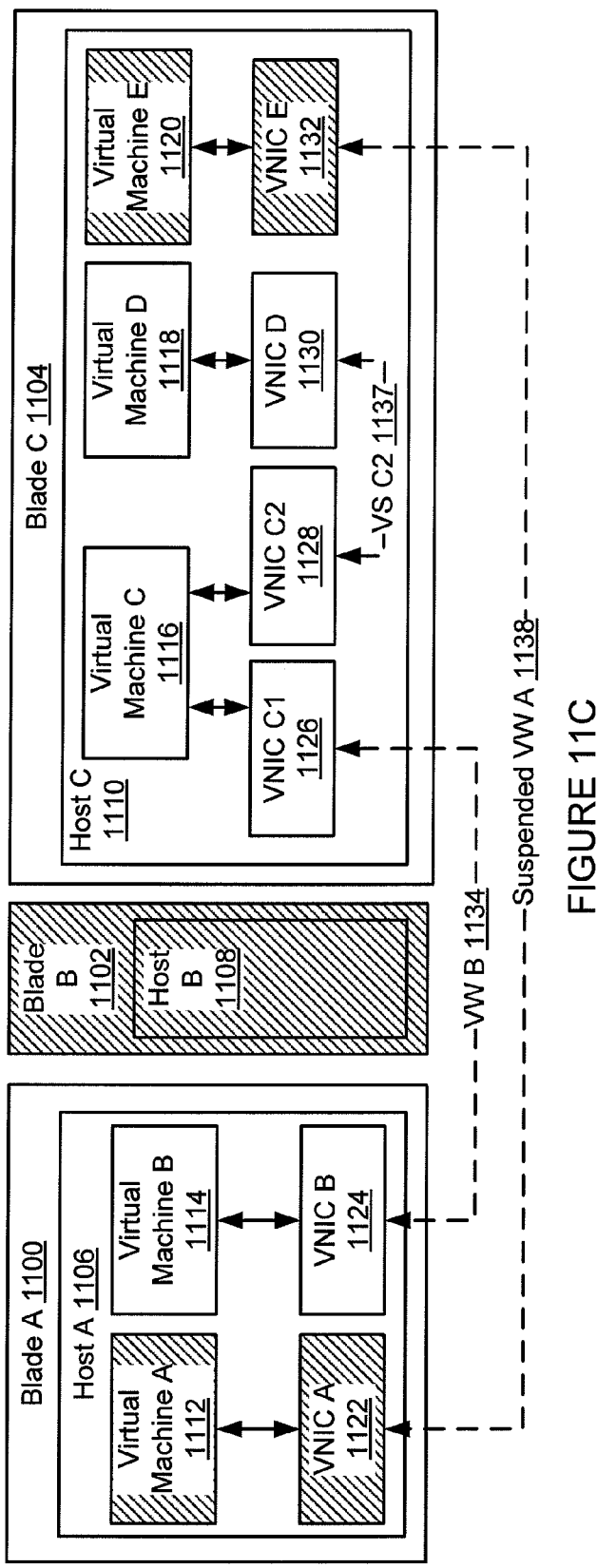

METHOD AND SYSTEM FOR POWER MANAGEMENT IN A VIRTUAL MACHINE ENVIRONMENT WITHOUT DISRUPTING NETWORK CONNECTIVITY

CROSS-REFERENCE TO RELATED APPLICATIONS

The present application is a continuation application of and, thereby, claims benefit under 35 U.S.C. §120 to U.S. application Ser. No. 12/165,456, entitled, "METHOD AND SYSTEM FOR POWER MANAGEMENT IN A VIRTUAL MACHINE ENVIRONMENT WITHOUT DISRUPTING NETWORK CONNECTIVITY." U.S. application Ser. No. 12/165,456 is incorporated by reference in its entirety. The present application contains subject matter that may be related to the subject matter in the following U.S. application filed on Dec. 10, 2007, and assigned to the assignee of the present application: "Method and System for Enforcing Resource Constraints for Virtual Machines across Migration" with U.S. Pat. No. 7,962,587.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method for power management. The method includes gathering resource usage data for a first blade and a second blade on a blade chassis, migrating each virtual machine (VM) executing on the first blade to the second blade based on the resource usage data and a first migration policy, wherein the first migration policy defines when to condense the number of blades operating on the blade chassis, and powering down the first blade after each VM executing on the first blade is migrated from the first blade.

In general, in one aspect, the invention relates to a method for power management. The method includes triggering a first migration based on a first current time matching a first time specified in a migration policy, wherein the migration policy defines when to condense the number of blades operating on the blade chassis, selecting a first blade to power down based on the triggering of the first migration, migrating each virtual machine (VM) executing on the first blade to a second blade based on the triggering of the first migration, and powering down the first blade after each VM executing on the first blade is migrated from the first blade.

In general, in one aspect, the invention relates to a computer readable medium comprising computer readable program code embodied therein for causing a computer system to gather resource usage data for a first blade and a second blade on a blade chassis, migrate each virtual machine (VM) executing on the first blade to the second blade based on the resource usage data and a first migration policy, wherein the first migration policy defines when to condense the number of blades operating on the blade chassis, and power down the first blade after each VM executing on the first blade is migrated from the first blade.

Other aspects of the invention will be apparent from the following description and the appended claims.

BRIEF DESCRIPTION OF DRAWINGS

FIGS. 11A-11C show an example of migrating a virtual machine for power management in accordance with one or more embodiments of the invention.

DETAILED DESCRIPTION

Figure 1:
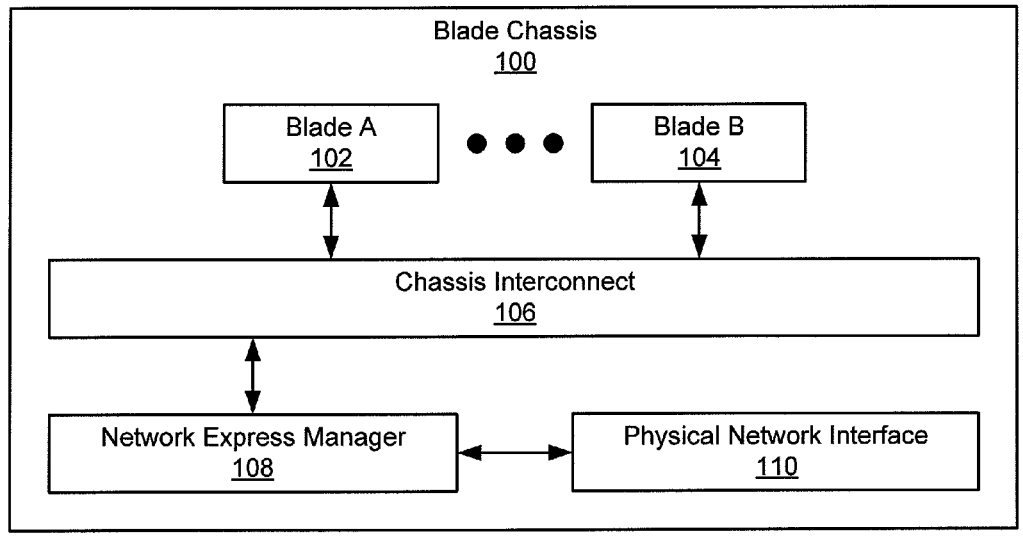
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for migrating virtual machines located on one blade in a blade chassis to another blade inn the blade chassis for performing power management. In one embodiment of the invention, after the migration of the virtual machines, the blade is powered down. Thus, the total power consumption of the system may be reduced.

Further, embodiments of the invention provide a mechanism for powering up blades when additional resources are required. Specifically, in one or more embodiments of the invention, the performance of each virtual machine is monitored to ensure that each blade is executing according to the performance standards. If the execution of a virtual machine is not adhering to performance standards because of lack of resources, then a blade is powered up to provide additional resources and virtual machines are migrated to the powered up blade.

Additionally or alternatively, the powering up and powering down of blades may be time based in accordance with one or more embodiments of the invention. Specifically, at a certain time, a blade may be selected to power down. Virtual machines may be migrated from the selected blade before powering down the blade. Conversely, the blade may be selected to be powered up. Specifically, the blade is powered up and virtual machines are migrated to the blade in accordance with one or more embodiments of the invention.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
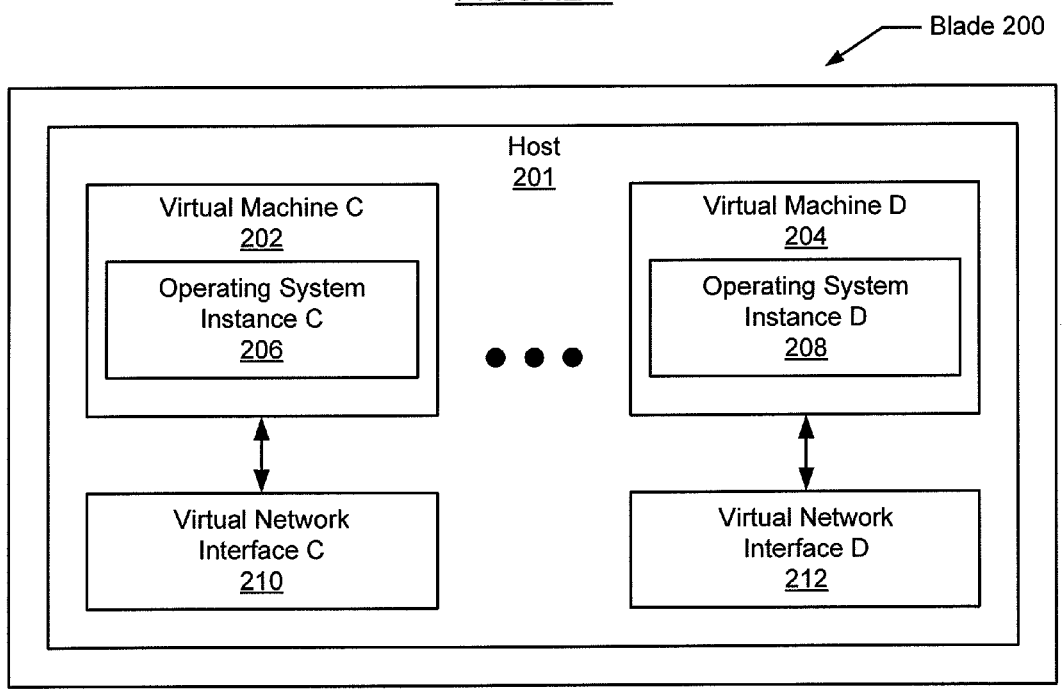
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments.

For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

In one embodiment of the invention, one of the blades in the blade chassis includes a control operating system executing in a virtual machine (also referred to as the control virtual machine). The control operating system is configured to manage the creation and maintenance of the virtual wires and/or virtual network paths (discussed below). In addition, the control operating system also includes functionality to migrate virtual machines between blades in the blade chassis (discussed below).

Figure 3:
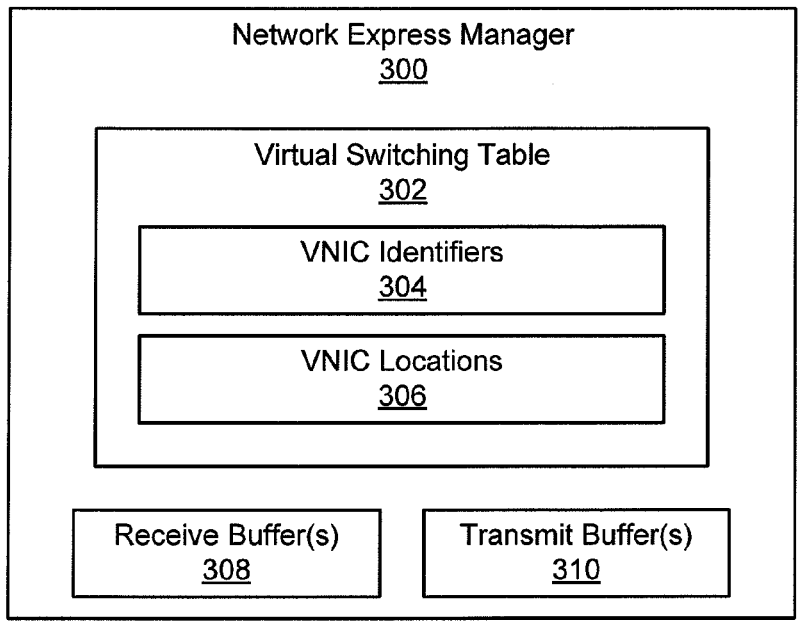
FIG. 3 shows a diagram of a network express manager in accordance with one or more embodiments of the invention.

Continuing with the discussion of FIG. 2, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). In another embodiment of the invention, the VNIC identifiers (304) may be media access control (MAC) addresses. Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). In one embodiment of the invention, once a determination is made about where to route a given packet, the packet is stored in the appropriate receive buffer (308) or transmit buffer (310). In one embodiment of the invention, each VNIC listed in the virtual switching table (302) is associated with a receive buffer (308) and a transmit buffer (310). The receive buffer (308) is configured to temporarily store packets destined for a given VNIC prior to the VNIC receiving (via a polling or interrupt mechanism) the packets. Similarly, the transmit buffer (310) is configured to temporarily store packets received from the VNIC prior to send the packet towards its packet destination.

In one embodiment of the invention, the receive buffer (308) enables the VNICs to implement bandwidth control. More specifically, when the VNIC is implementing bandwidth control, packets remain in the receive buffer (308) until the VNIC (or an associated process) requests packets from the receive buffer (308). As such, if the rate at which packets are received is greater than the rate at which packets requested by the VNIC (or an associated process), then packets may be dropped from the receive buffer once the receive buffer is full. Those skilled in the art will appreciate that the rate at which packets are dropped from the receive buffer is determined by the size of the receive buffer.

Continuing with the discussion of FIG. 3, the network express manager (300) may be configured to route network traffic between different VNICs located in the blade chassis. In one or more embodiments of the invention, using the virtual switching table (302) in this manner facilitates the creation of a virtual network path, which includes virtual wires (discussed below). Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
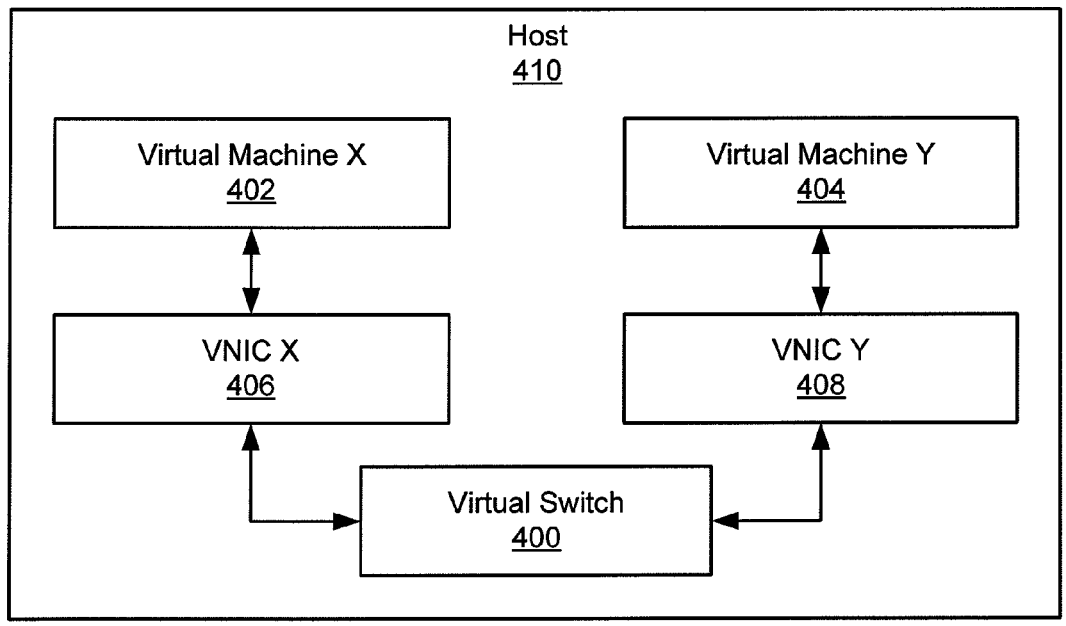
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host (410) within which virtual machine X (402) and virtual machine Y (404) are located. Specifically, the host (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
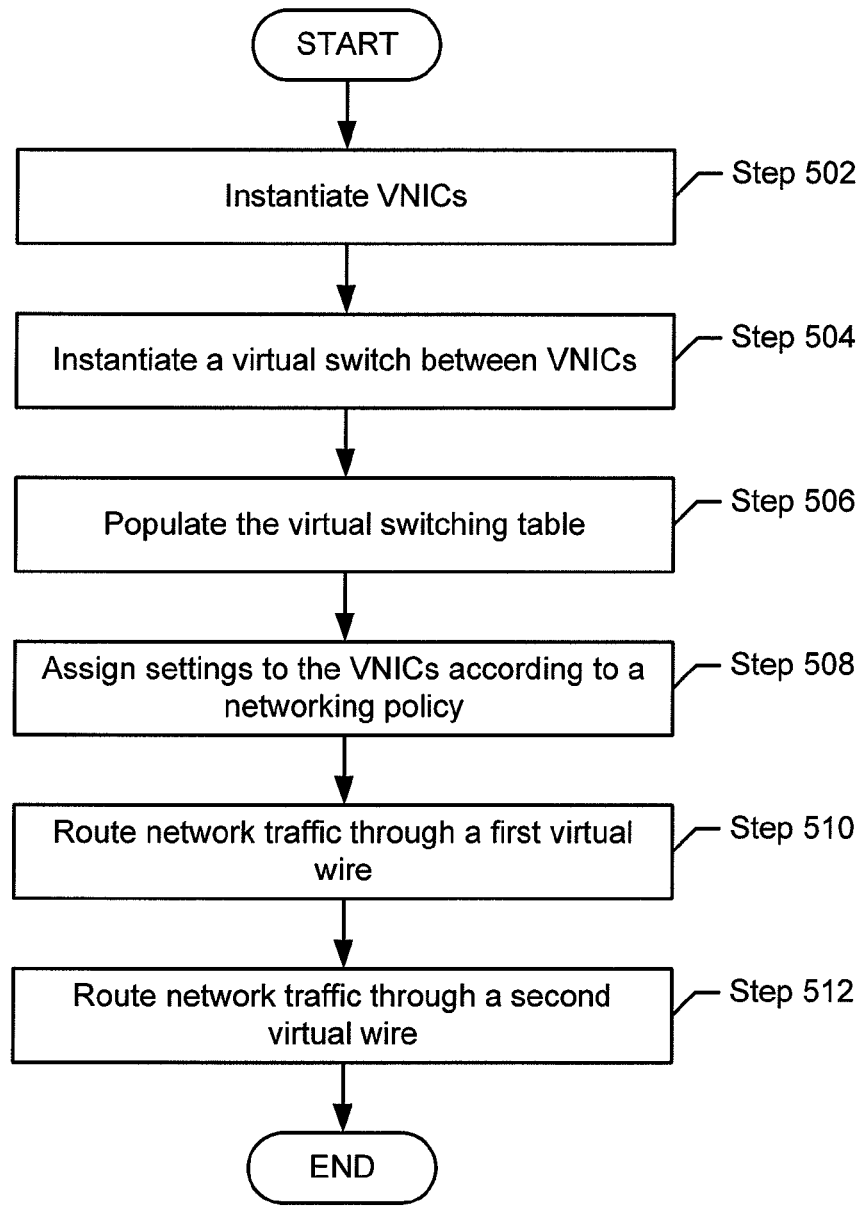
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host, i.e., an operating system that is hosting the virtual machine associated with the VNIC. Registering the VNIC object establishes an interface between the host's networking functionality and the abstraction layer provided by the VNIC. Thereafter, when the host receives network traffic addressed to the VNIC, the host forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480, 261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, IP addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

In one embodiment of the invention, each virtual wire may be associated with a priority (discussed below in FIGS. 11A-11C). In addition, each virtual wire may be associated with a security setting, which defines packet security (e.g., encryption, etc.) for packets transmitted over the virtual wire. In one embodiment of the invention, the bandwidth, priority and security settings are defined on a per-wire basis. Further, the aforementioned settings are the same for VNICs on either end of the virtual wire.

In one embodiment of the invention, a combination of two or more virtual wires may be thought of as a "virtual network path." In one embodiment of the invention, the bandwidth, priority and security settings for all virtual wires in the virtual network path are the same. Further, the aforementioned settings are the same for VNICs on either end of the virtual wires, which make up the virtual network path.

Continuing with the discussion of FIG. 5, once the virtual wires and/or virtual network paths have been created and configured, network traffic may be transmitted over the virtual network path through, for example, a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC. In one embodiment of the invention, at least Steps 502-508 are performed and/or managed by the control operating system.

Figure 6A:
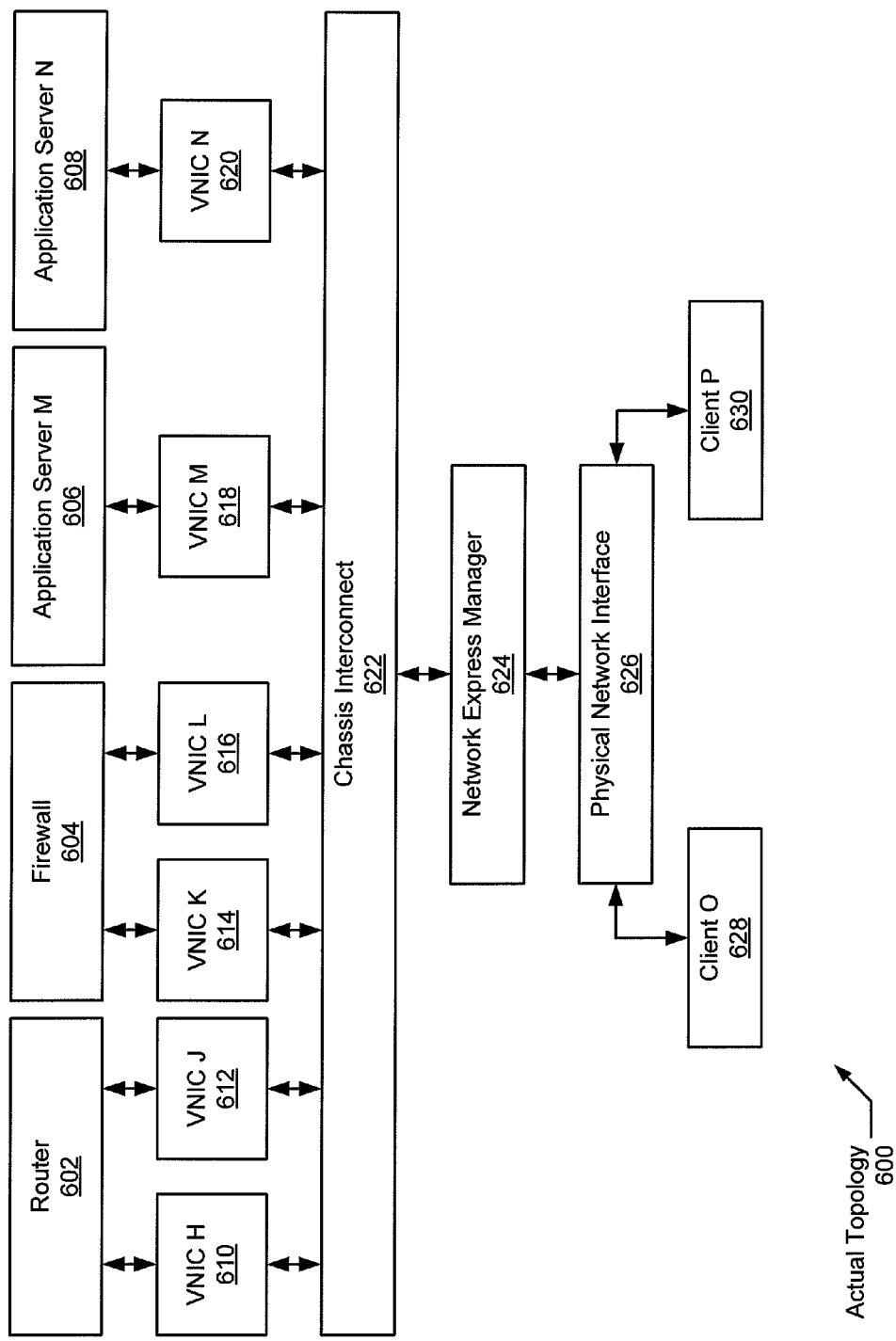
FIGS. 6A-6C show an example of creating virtual network paths in accordance with one or more embodiments of the invention.
Figure 6B:
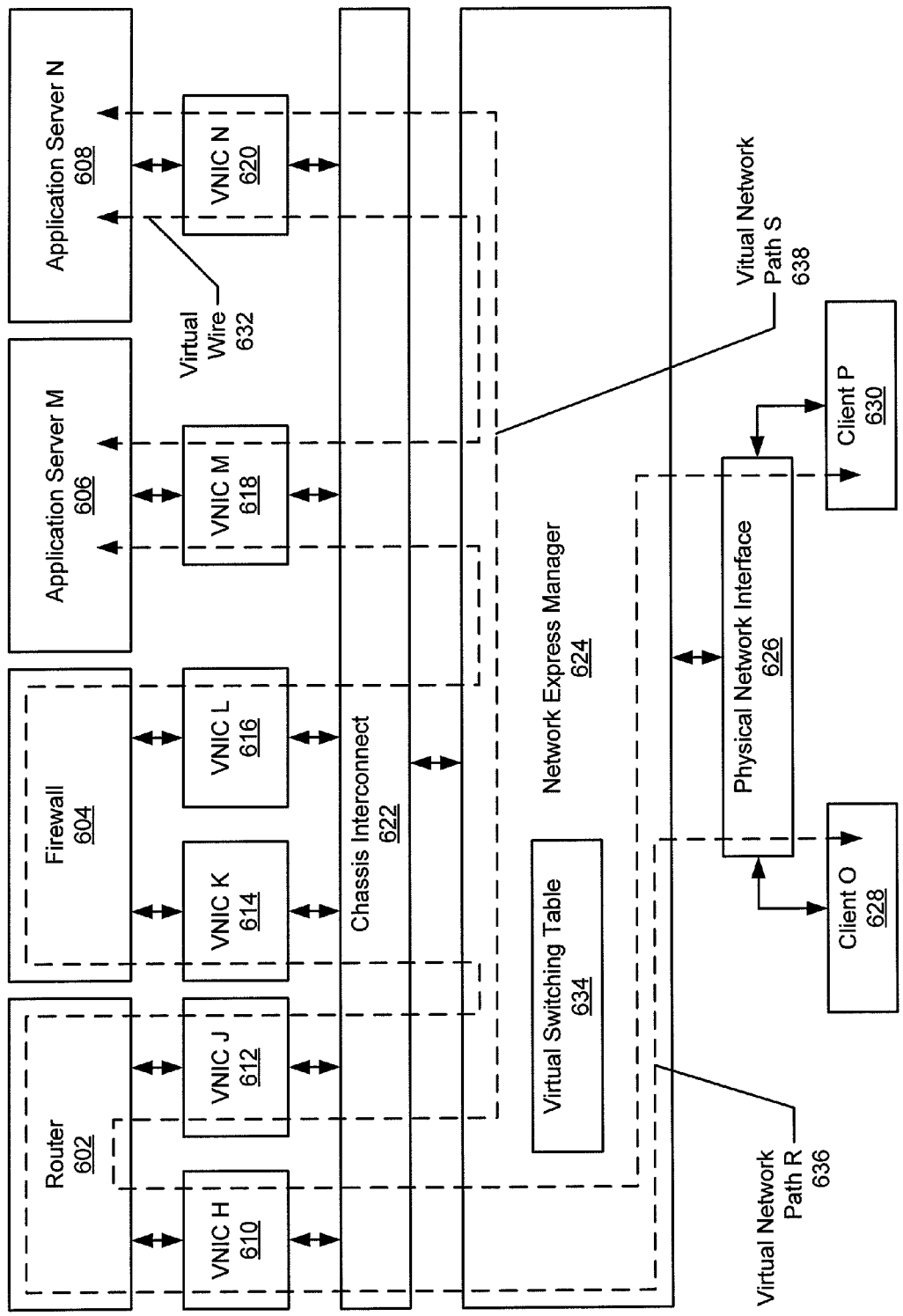
Figure 6C:
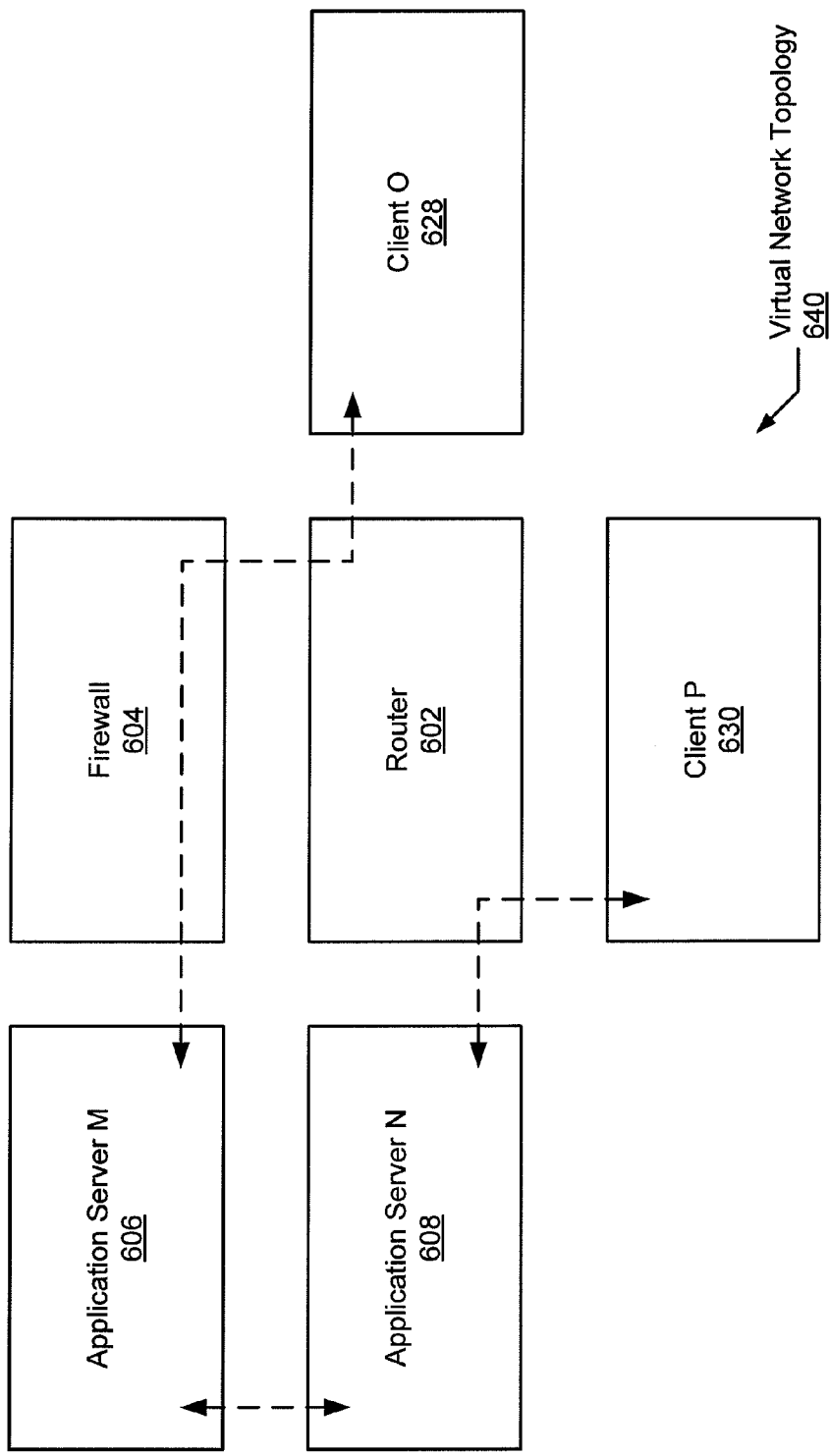

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). As shown in FIG. 6A, each virtual machine is communicatively coupled to all other virtual machines. However, as discussed below, while there is full connectivity between the virtual machines, embodiments of the invention create virtual wires and/or virtual network paths to limit the connectivity of the virtual machines. For ease of illustration, the blades themselves are not shown in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630).

In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be thought of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) that results from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Embodiments of the invention allow for virtual network paths to be created using virtual wires, without the need for traditional network wires. Specifically, by placing virtual machines in blades coupled via a chassis interconnect, and routing network traffic using VNICs and a virtual switching table, the need for traditional network wires between the virtual machines is avoided. Thus, embodiments of the invention facilitate the creation and reconfiguration of virtual network topologies without the physical labor typically involved in creating a traditional wired network.

In one embodiment of the invention, one or more virtual machines may be migrated from one blade to another blade in the blade chassis. Migration may be necessitated by a number of factors. For example, a virtual machine may need to be migrated from one blade to another blade because the virtual machine requires additional resources, which are not available on the blade on which it is currently executing. Alternatively, a virtual machine may need to be migrated from one blade to another blade because the blade on which the virtual machine is currently executing is powering down, failing, and/or other suspending operation. Alternatively, the migration may be triggered based on a migration policy. Migration policies are discussed below and in FIGS. 9A-11C.

In one embodiment of the invention, at least the bandwidth constraint associated with virtual machine is preserved across the migration, such that at least the bandwidth constraint associated with virtual machine is the same before and after the migration of the virtual machine. Those skilled in the art will appreciate that the bandwidth associated with a given virtual machine is enforced by VNIC associated with the virtual machine. As the VNIC is located in the host executing on the blade, the host includes functionality to associate the VNIC with the virtual machine and set the bandwidth of the VNIC.

Figure 7A:
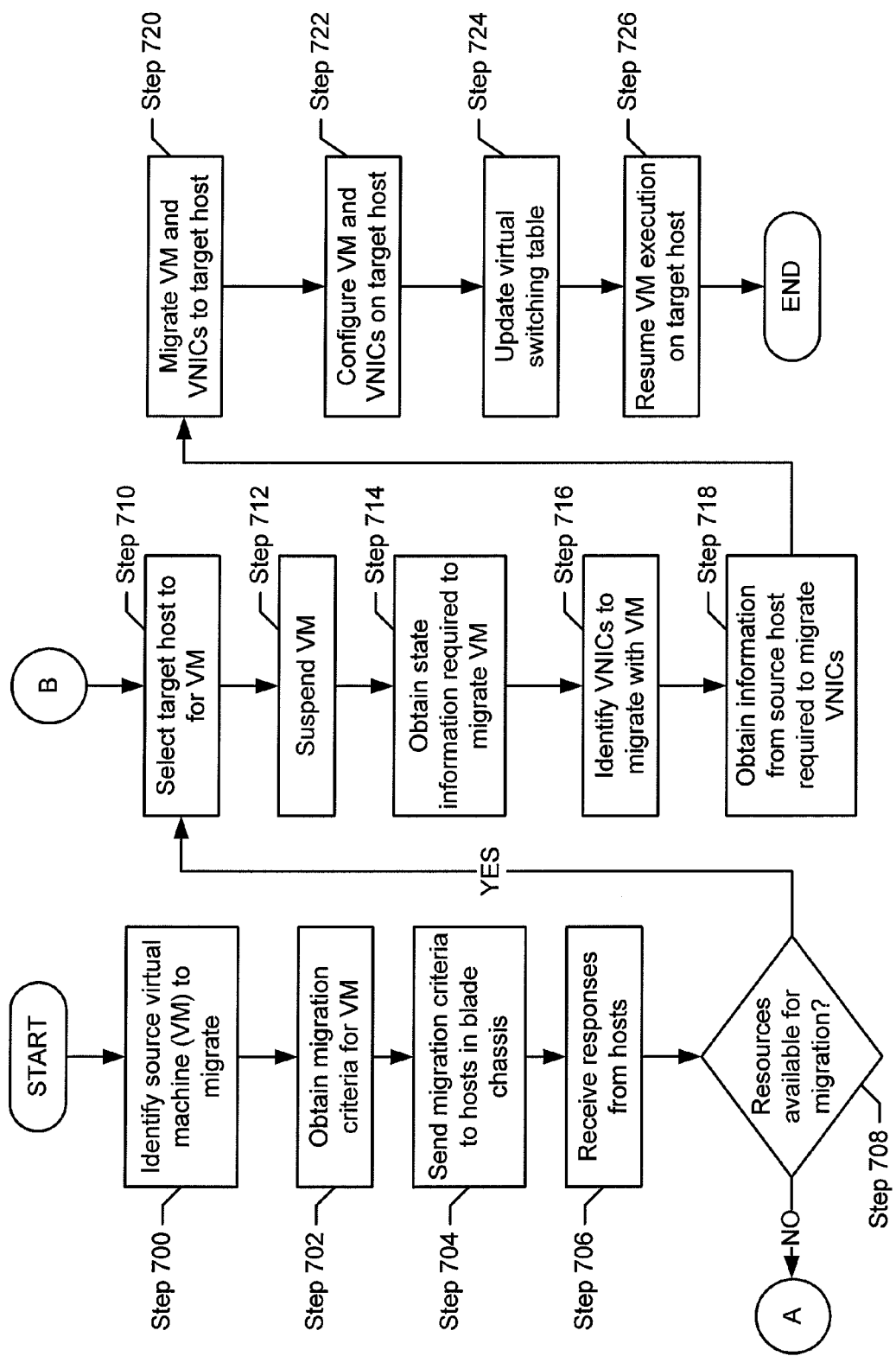
FIGS. 7A-7B show a flowchart of a method for migrating a virtual machine in accordance with one or more embodiments of the invention.
Figure 7B:
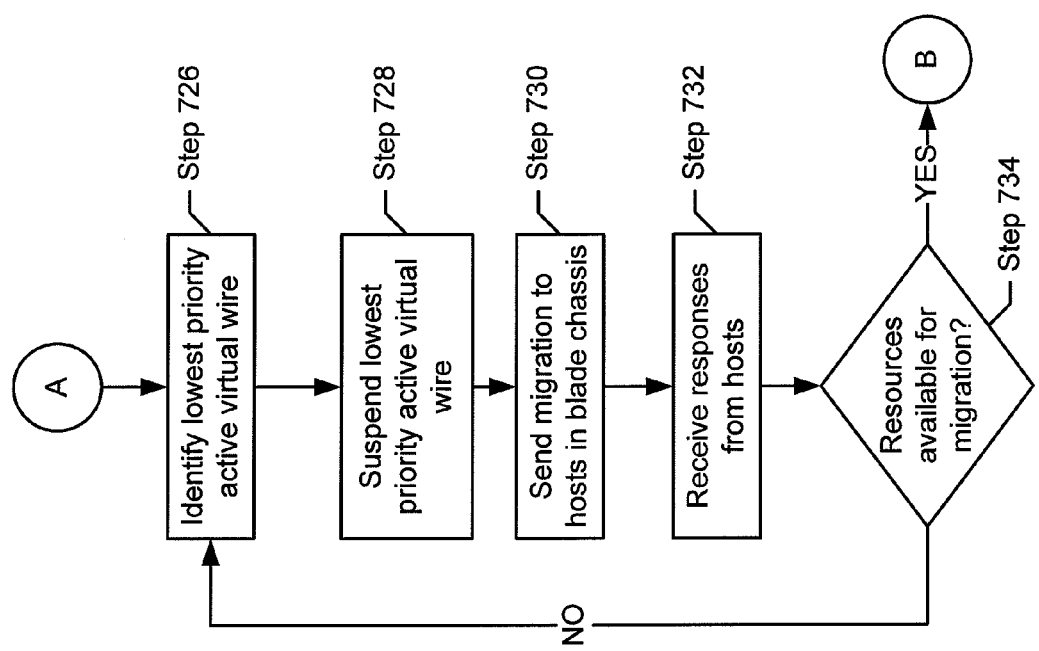

FIGS. 7A-7B show flowcharts of a method for migrating a virtual machine in accordance with one or more embodiments of the invention. In one or more embodiments of the invention, one or more of the steps shown in FIGS. 7A-7B may be omitted, repeated, and/or performed in a different order. Accordingly, embodiments of the invention should not be considered limited to the specific arrangement of steps shown in FIG. 7A-7B.

Referring to FIG. 7A, in Step 700, a virtual machine (VM) to migrate is identified. The determination of whether to migrate a given VM may be based on any number of factors, some of which are discussed above. In Step 207, migration criteria for the VM are obtained. In one embodiment of the invention, the migration criteria corresponds the bandwidth constraint of the VM (e.g., the minimum bandwidth and/or maximum bandwidth available to the VM), a hardware constraint (e.g., minimum amount of computing resources required by the VM), a software constraint (e.g., version of host operating system required by VM), and/or any other constraint required by the VM. In one embodiment of the invention, the migration constraints may be obtained from the VM, the host on which the VM is executing, the control operating system, or any combination thereof.

In Step 704, the control operating system sends a request including the migration criteria to hosts executing on blades in the blade chassis. In one embodiment of the invention, the control operating system uses a multicast message to send the request. In Step 706, the control operating system receives responses from the hosts. The responses may include: (i) a response indicating that the host which sent the response is unable to satisfy the migration criteria or (ii) a response indicating that the host which sent the response is able to satisfy the migration criteria.

In Step 708, a determination is made, using the responses received in Step 706, about whether there are sufficient resources available to migrate the VM. If there are insufficient resources, the method proceeds to FIG. 7B (described below). Alternatively, if there are sufficient resources, the method proceeds to Step 710. In Step 710, a target host is selected. The target host corresponds to a host to which the VM will be migrated. This selection is made by the control operating system based on the responses received in Step 706.

In Step 712, execution on the VM is suspended. In one embodiment of the invention, suspending the VM may also include suspending execution of associated VNICs (discussed below). In Step 714, state information required to migrate the VM is obtained. In one embodiment of the invention, the state information corresponds to information required to resume execution of the VM on the target host from the state of the VM prior to being suspended in Step 712.

In Step 716, the VNIC(s) to migrate with the VM is identified. Identifying the VNIC(s) corresponds to determining which VNIC(s) is associated with the VM. In one embodiment of the invention, a VNIC is associated with the VM if the VNIC is executing on the same host as the VM and the VM receives packets from and/or transmits packets to the VNIC. In Step 718, information required to migrate the VNIC identified in Step 716 is obtained. In one embodiment of the invention, the information corresponds to information required to resume execution of the VNIC on the target host from the state of the VNIC prior to suspending the VM in Step 712.

In Step 720, VM and VNIC(s) are migrated to the target host. In Step 722, the VM and VNIC(s) are configured on the target host. In one embodiment of the invention, the VM and VNIC(s) are configured such that they operate in the same manner on the target host as they operated on the source host (i.e., the host from which they were migrated). Configuring the VM and VNICs may also include configuring various portions of the target host. In one embodiment of the invention, the VM and VNIC(s) are configured using the information obtained in Steps 714 and 718. In one embodiment of the invention, Step 722 is initiated and monitored by the control operating system. In Step 724, the virtual switching table is updated to reflect that the VNIC(s) identified in Step 716 are on the target host. In Step 726, the execution of the VM is resumed on the host.

Referring to FIG. 7B, as described above, if there are insufficient resources, the method proceeds to FIG. 7B. In Step 726, the lowest priority active virtual wire operating in the blade chassis is obtained. In one embodiment of the invention, the control operating system maintains a data structure which includes the priorities of the various virtual wires operating in the blade chassis. Further, in one embodiment of the invention, only the control operating system includes functionality to set and change the priorities of the virtual wires.

In Step 728, the lowest priority active virtual wire is suspended. In one embodiment of the invention, suspending the lowest priority active virtual wire includes suspending operation of the VNICs on either end of the virtual wire. In addition, the VMs associated with the VNICs may also be suspended. Further, suspending the VNICs and, optionally, the VMs, results in freeing bandwidth and computing resources on the respective blades on which the suspended VNICs and VMs were executed.

In Step 730, the control operating system sends a request including the migration criteria to hosts executing on blades in the blade chassis. In one embodiment of the invention, the control operating system uses a multicast message to send the request. In Step 732, the control operating system receives responses from the hosts. The responses may include: (i) a response indicating that the host which sent the response is unable to satisfy the migration criteria or (ii) a response indicating that the host which sent the response is able to satisfy the migration criteria.

In Step 734, a determination is made, using the responses received in Step 732, about whether there are sufficient resources available to migrate the VM. If there are insufficient resources, the method proceeds to Step 726. Alternatively, if there are sufficient resources, the method proceeds to Step 710 in FIG. 7A.

In one embodiment of the invention, if one or more virtual wires are suspended per Step 728, then the method described in FIGS. 7A and 7B may be used to migrate the VMs associated with the suspended virtual wires. In one embodiment of the invention, the order in which VMs are migrated to resume activity of suspended virtual wires is based on the priority of the suspended virtual wires.

Figure 8A:
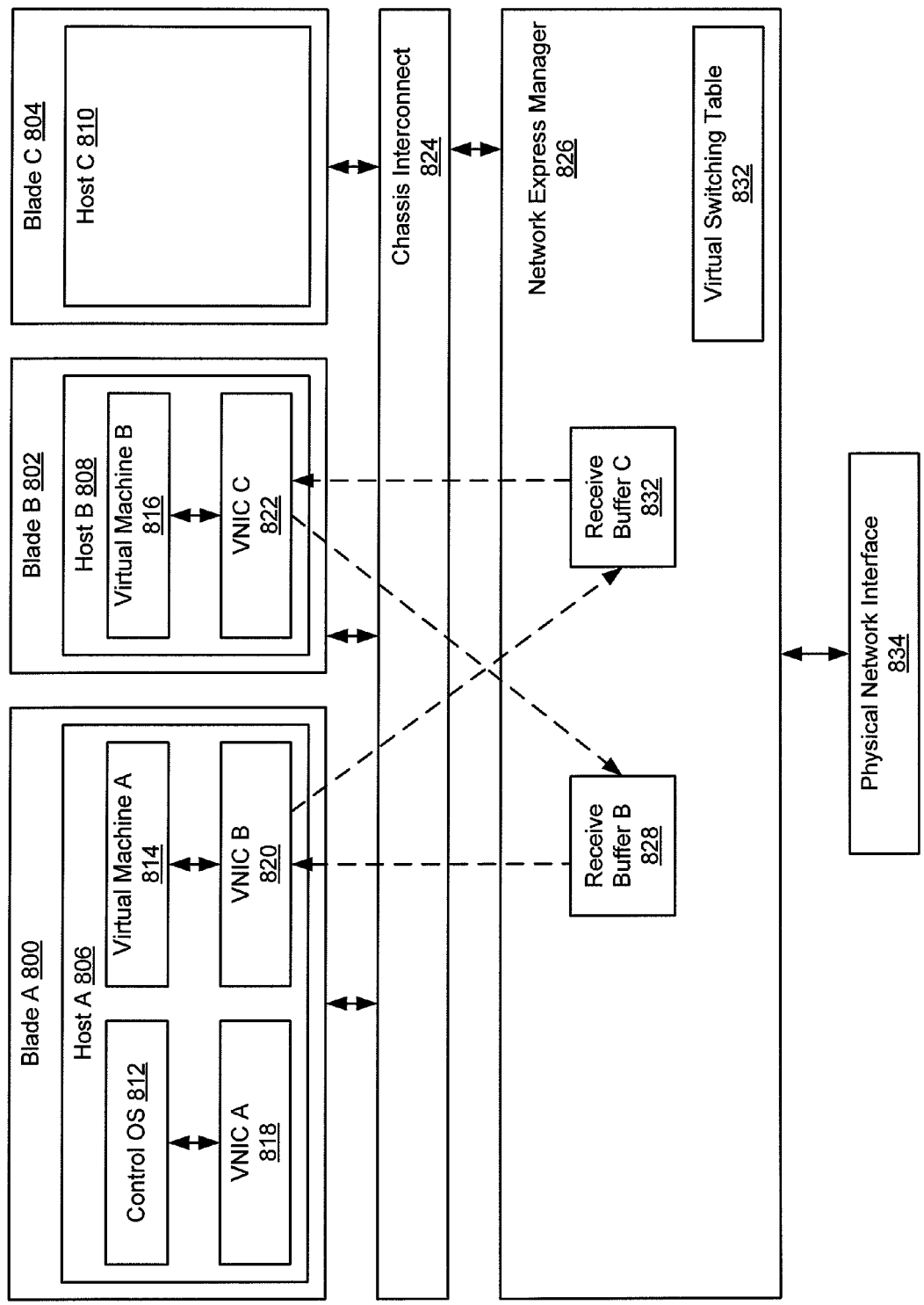
FIGS. 8A-8B show an example of migrating a virtual machine in accordance with one or more embodiments of the invention.
Figure 8B:
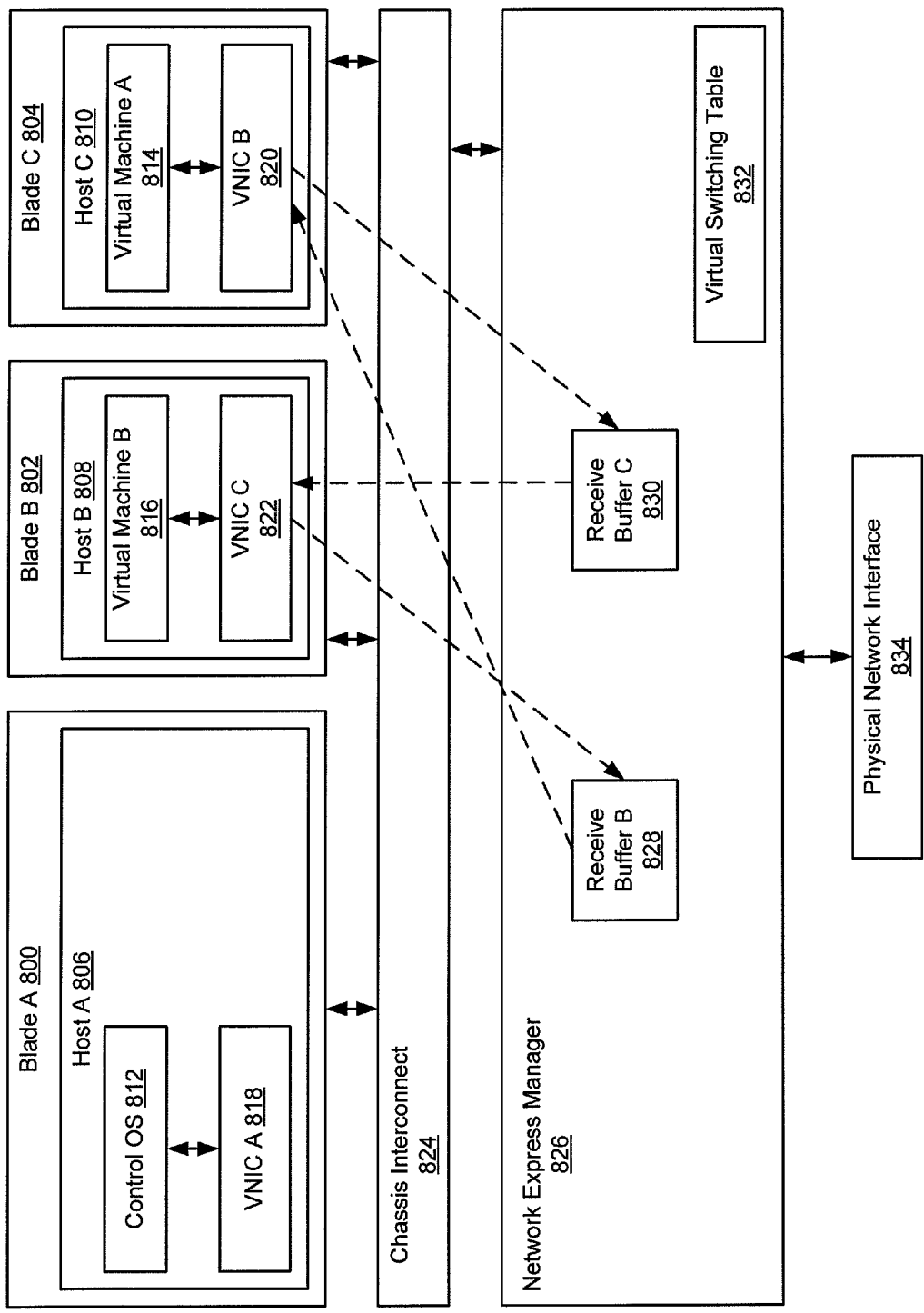

FIGS. 8A-8B show an example of migrating a virtual machine in accordance with one or more embodiments of the invention. FIGS. 8A-8B are provided as examples only, and should not be construed as limiting the scope of the invention.

Referring to FIG. 8A, consider the scenario in which the system includes three blades (800, 802, 804) connected to the chassis interconnect (824) in a blade chassis (not shown). The system is initially configured such that Blade A (800) includes Host A (806), Blade B (802) includes Host B (808) and Blade C (804) includes Host C (810).

As shown in FIG. 8A, Host A (806) includes VNIC A (818) associated with Control Operation System (OS) (812) and VNIC B (820) associated with Virtual Machine (VM) A (814). Further, Host B (808) includes VNIC C (822) associated with VM B (816). Host C (810) initially does not include any VMs.

As shown in FIG. 8A, VM A (814) communicates with VM B (816) using a virtual wire with a bandwidth limit of 5 gigabits per second (GBPS). The virtual wire connects VNIC B (820) with VNIC C (822). As such, network traffic from VM A (814) is transmitted through VNIC B (820) to receive buffer C (830) where it remains until it is sent to or requested by VNIC C (822). Similarly, network traffic from VM B (816) is transmitted through VNIC C (822) to receive buffer B (828) where it remains until it is sent to or requested by VNIC B (820). The virtual switching table (832) in the interface manager (826) implements the virtual wire.

After system has been configured as described above and shown in FIG. 8A, a determination is made that VM A (814) requires additional processing resources and that such resources are not available on Host A (806). In accordance with FIGS. 7A and 7B, the control OS determines the migration criteria for VM A (806). The migration criteria include a hardware constraint defining the processing resources required by VM A (818) as well as a bandwidth constraint (i.e., 5 GBPS).

The control OS then sends a request including the migration criteria to the hosts in the blade chassis (i.e., Host B (808) and Host C (810)). Host B (808) responds that it does not have sufficient resources to satisfy the migration criteria. Host C responds that it has sufficient resources to satisfy the migration criteria. At this stage, the control OS selects Host C (810) as the target host. The control OS then initiates the migration of VM A (814) along with VNIC B (820) to Host C (810) in accordance with Steps 712-726.

The result of the migration is shown in FIG. 8B. As shown in FIG. 8B, after the migration, VM A (814) and VNIC B (820) are located on Host C (820). Further, the virtual wire is preserved across the migration.

In one or more embodiments of the invention, migration of virtual machines is based on one or more migration policies. A migration policy defines when to coalesce or expand the number of blades executing in a blade chassis. Specifically, a migration policy may be used to perform power management. The migration policy may be a coalesce migration policy, an expansion migration policy, or a time based migration policy.

In one or more embodiments of the invention, a coalesce policy defines when to decrease the number of blades executing in the blade chassis. Decreasing the number of blades executing may cause a decrease in the total power usage by the blade chassis. In one or more embodiments of the invention, the coalesce policy is based on the percentage resource usage on the blade chassis. A percentage resource usage is the amount that one or more resources on the blade chassis are used as compared to the total resources available. For example, the resource may be the percentage of the processor used, the throughput of packets, latency, input/output requests, and bandwidth availability.

The coalesce migration policy may be defined with different resource usage percentage ranges. In the lowest range (i.e., the percentage resource used is low) the migration policy may specify that the virtual machines on the blade are migratable and, subsequently, the blade may be powered down. In the medium range, the migration policy may specify that that the blade may accept virtual machines from another blade in order for the other blade to be powered down. In the high range, the migration policy may specify that the blade should not be powered down and the blade cannot accept additional virtual machines. For example, consider the scenario in which a migration policy defines the low range, medium range, and high range as below 40%, between 40% and 80%, and above 80% respectively. If the percentage resource usage on blade X is 25% and on blade Y is 57%, then based on the migration policy, virtual machines on blade X may be migrated to blade Y. After the virtual machines are migrated off of blade X, blade X may be powered down.

Another type of migration policy is an expansion migration policy. In one or more embodiments of the invention, an expansion migration policy defines performance standards for the virtual machines executing on a blade. The performance standard may be defined on a per-blade or per-virtual machine basis. For example, the performance standard may require that the throughput of packets for the virtual machine is at a certain level, the latency for processing instructions is below a specified level, and/or the available bandwidth for the blade is at a specified level. When the performance standards are not complied with by the execution of the virtual machine, then the expansion migration policy may indicate that one or more virtual machines should be migrated from the current blade to a different blade. If all of the currently executing blades do not have resources available, then a blade which was previously powered down may be powered up. Thus, the virtual machines may be migrated to the newly powered up blade.

In one or more embodiments of the invention, the migration policy may be a time based migration policy. A time based migration policy defines, for different times, the number of blades that should be powered up. For example, during the day (e.g., between 8:00 AM and 6:00 PM), the time based migration policy may specify that all blades should be powered up. During the evening and on weekends, the time based migration policy may specify that only half of the blades should be powered up. Thus, when the blades are expected to be operating at peak capacity, such as during the day, the migration policy specifies that all blades should be powered up. Conversely, when the blades are expected to be operating minimally, such as at night or on the weekends, the migration policy specifies that only a portion of the blades should be powered up in order to conserve energy.

Figure 9A:
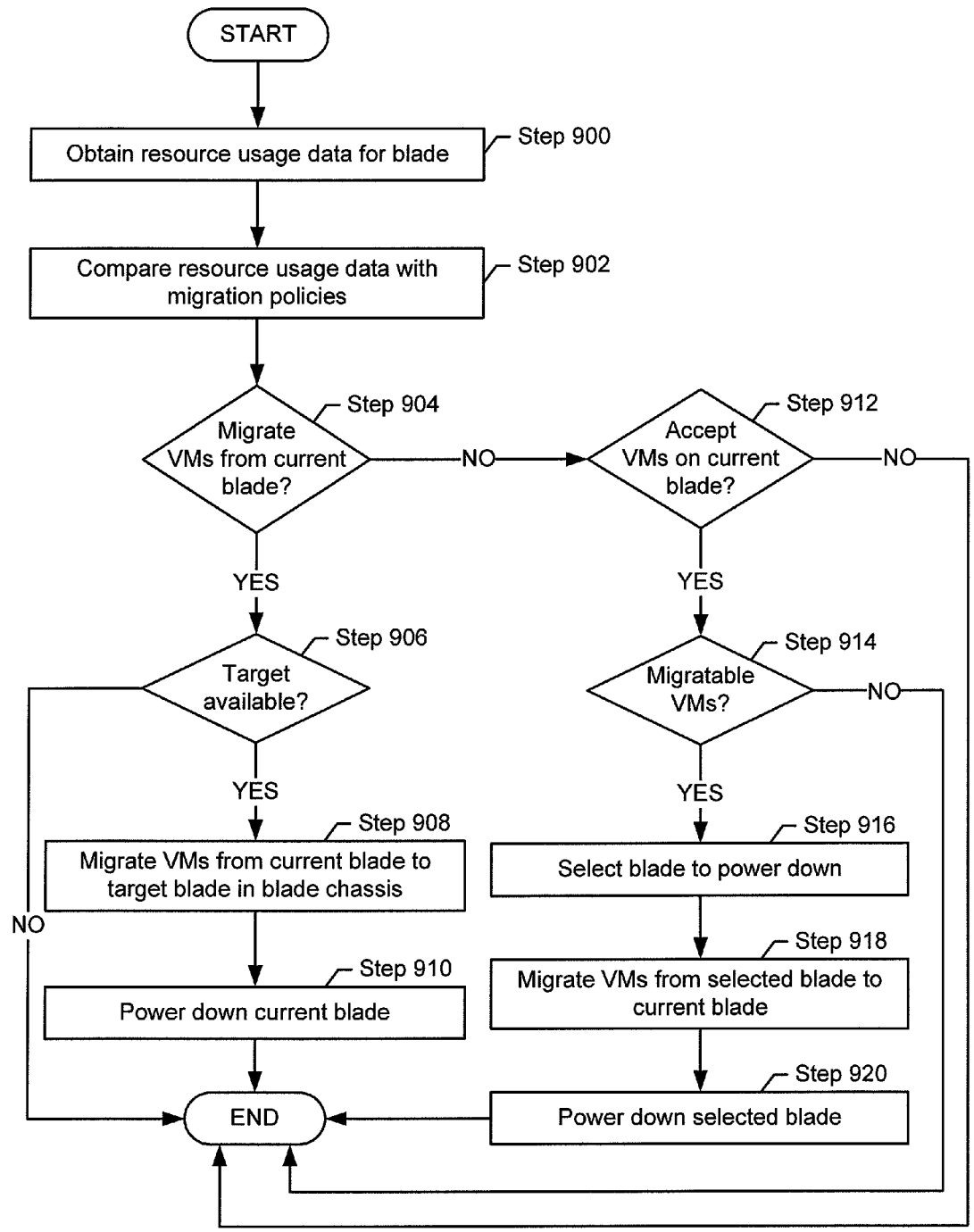
FIGS. 9A-10 show flowcharts of migrating virtual machines for power management in one or more embodiments of the invention.
Figure 9B:
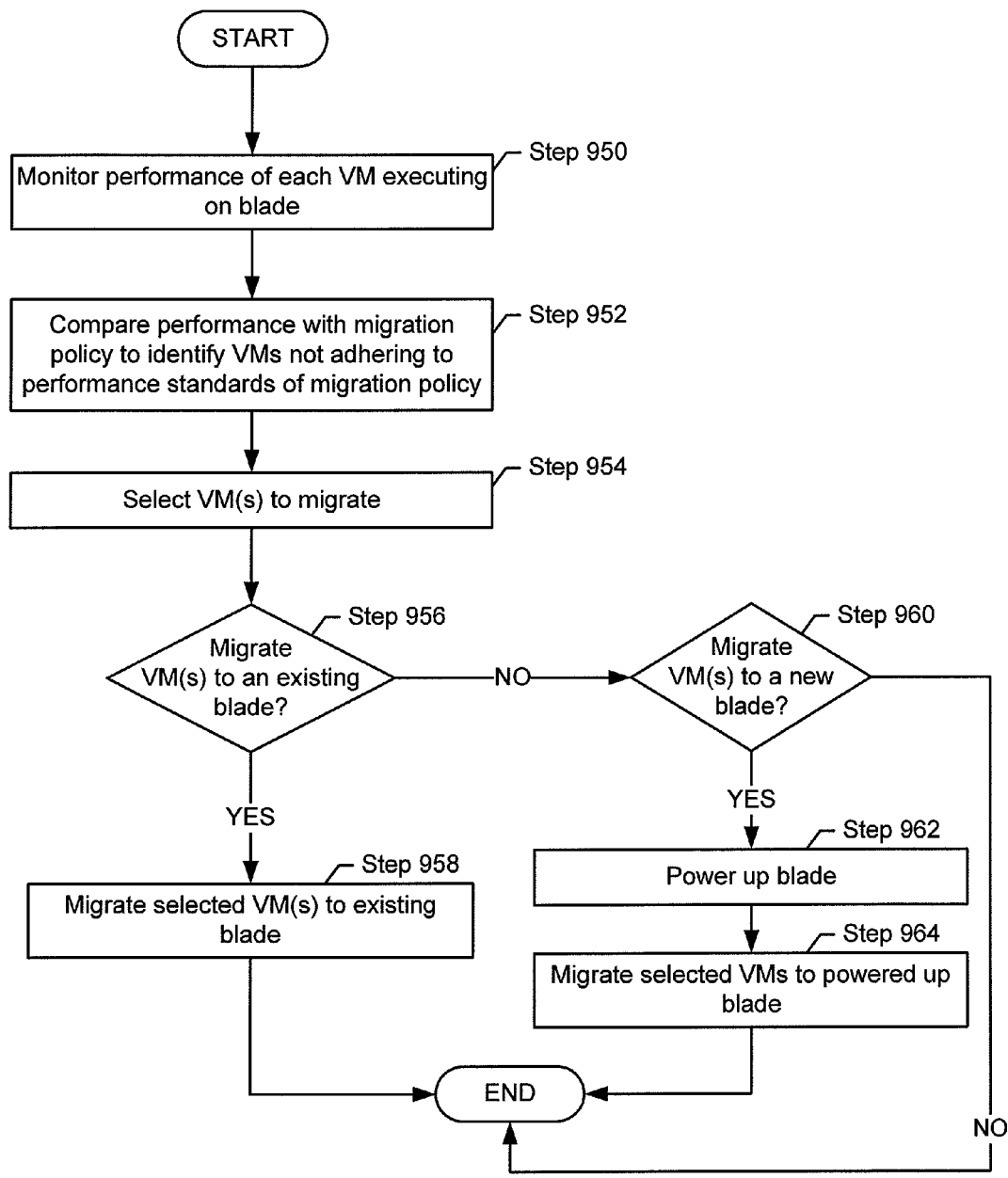
Figure 10:
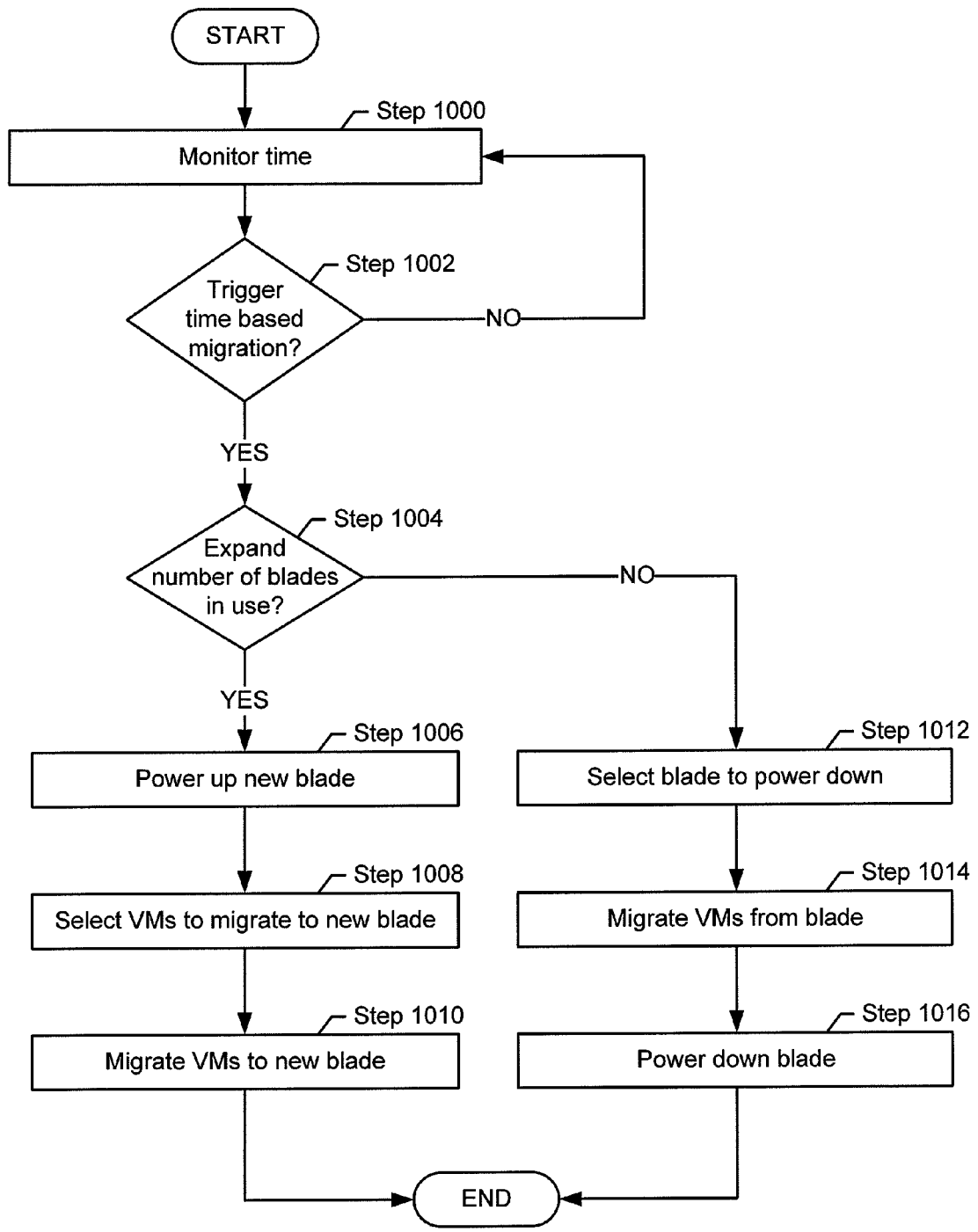

FIGS. 9A-10 show flowcharts of migrating virtual machines for power management in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 9A shows a flowchart of a method for migrating virtual machines based on a coalesce migration policy. In step 900, resource usage data for a blade is obtained. Specifically, each blade monitors how much of each resource specified in the coalesce migration policy is in use by the blade. Monitoring resource usage may be performed using techniques known in the art. If a centralized system for determining when to migrate is used, the obtaining the resource usage data may be performed by the control OS. Alternatively, a peer-to-peer based system may be used to determine resource usage.

In step 902, resource usage data is compared with the migration policy. In one or more embodiments of the invention, the comparison is performed on a per-blade basis. The blade being compared with the migration policy may be referred to as the current blade. Comparing the current blade with the migration policy may be performed by comparing the amount of each resource used as defined in the resource usage data with the migration policy.

In step 904, a determination is made whether to migrate virtual machines from the current blade. Specifically, a determination is made whether the migration policy indicates that virtual machines should be migrated from current the blade.

If a determination is made to migrate virtual machines from the current blade, then a determination is made whether a target blade is available in step 906. One method for determining whether a target blade is available may be performed by gathering migration criteria for each virtual machine executing on the current blade. If a host on the current blade is performing step 902 and/or step 904, the host may send a request to hosts executing on each blade in the blade chassis. The request may include migration criteria for each virtual machine executing on the current blade. Hosts on the other blades may respond to the request with an indication of whether they can satisfy the migration criteria of one or more virtual machines. If the host on another blade can satisfy the migration criteria, then this host becomes the target host for one or more virtual machines on the current blade. In one or more embodiments of the invention, more than one target host may exist.

Rather than sending a request to the hosts on the different blades, the hosts may use shared data repository in the network express manager. Specifically, each host may read and write migration criteria, resource availability, and/or responses to requests to the shared data repository. Thus, by accessing the shared data repository, the current blade may determine whether a target blade is available.

Alternatively, the current blade may send a message to the control OS that the virtual machines on the current blade need to migrate or the control OS may be performing step 902 and/or step 904. In such a scenario, the control OS may manage the migration as discussed above and in FIGS. 7A and 7B. In one or more embodiments of the invention, when the migration is based on a coalesce migration policy, no virtual wires are suspended to perform the migration. Rather, in such a scenario, the determination is made that a target blade is unavailable. However, in alternative embodiments, the control OS may suspend virtual wires based on the priority. For example, the migration policy may indicate that virtual wires operating at a specified low level of priority may be suspended for the purposes of power management. In such a scenario, if sufficient resources are available after suspending one or more virtual wires, then the target host is considered available.

If a target blade is available, then virtual machines are migrated from the current blade to the target blade in the blade chassis in step 908. Migrating the virtual machines may be performed as discussed above and in step 712-726 of FIG. 7A. In step 910, the current blade is powered down. Specifically, the blade may be powered down or placed in standby mode.

If, as an alternative in step 904, a determination is made not to migrate virtual machines from the current blade, then a determination is made whether to accept virtual machines on the current blade in Step 912. Specifically, a determination is made whether the coalesce migration policy indicates that the current blade can receive data based on the resource usage data.

If a determination is made to accept virtual machines in step 912, then a determination is made whether migratable virtual machines exist in the blade chassis in step 914. A migratable virtual machine is a virtual machine on a different blade, such as a blade being powered down, that can be migrated to the current blade. Determining whether migratable virtual machines exist may be based on, for example, whether any requests with migration criteria are sent to the current blade, whether the shared data repository indicates that at least one blade is powering down, or whether the control OS identifies a virtual machine to migrate to the current blade after comparing resource usage data on the different blades. The aforementioned examples or only a few of the techniques that may be used to identify whether migratable virtual machines exist. Other techniques may be used without departing from the scope of the invention.

If migratable virtual machines exist, then the blade to power down is selected in step 916. The selected blade to power down corresponds to a blade that may be powered down in accordance with the migration policy and has the migratable virtual machines. In step 918, the migratable virtual machines are migrated from the selected blade to the current blade. Migrating the virtual machines may be performed as discussed above and in step 712-726 of FIG. 7A. In step 920, the selected blade is powered down. Specifically, the blade may be powered down or placed in standby mode. Returning to step 912 and step 914, if a determination is made not to accept virtual machines on the current blade or if no migratable virtual machines exist, then the current blade may continue executing without migrating virtual machines to the current blade.

FIG. 9B shows a flowchart of a method for migrating virtual machines based on an expansion migration policy. In step 950, the performance of each virtual machine executing on the blade is monitored. Monitoring the performance of each virtual machine may be performed using techniques known in the art. In step 952, the performance is compared with the migration policy to identify virtual machines not adhering to the performance standards of the migration policy. If any virtual machines are not adhering to the performance standards, than a determination may be made as to which resources (e.g., main memory, number of processors, guaranteed bandwidth, etc.) would be required for the identified virtual machines to comply with the performance standards.

At this stage, a determination may be made to migrate one or more virtual machines from the current blade. The virtual machines to migrate are selected in step 954. The selected virtual machines may be the identified virtual machines not adhering to the performance standards or one or more of the other virtual machines that are executing on the blade. For example, if the resource that would be required for the identified virtual machines would be available once other virtual machines are migrated, then a determination may be made to migrate the other virtual machines. The determination may be based on the allocation of resources. For example, if load balancing across the blades is desired, then the selected virtual machines may be based on the virtual machines that achieve load balancing.

In step 956, a determination is made whether to migrate the selected virtual machine(s) to an existing blade. Determining whether to migrate the selected virtual machines is based on whether an existing blade has sufficient resources available for the selected virtual machine. For example, as discussed above, determining whether a blade has sufficient resources may be performed by sending a request with migration criteria to the host of each blade. If a host responds that sufficient resources are available, then the selected virtual machines can be migrated to an existing blade. In step 958, the selected virtual machines are migrated to an existing blade. Migrating the selected virtual machines to an existing blade may be performed as discussed above.

Returning to step 956, if a determination is made not to migrate the virtual machines to an existing blade than a determination is made whether to migrate the virtual machines to a new blade in step 960. The determination is made whether to migrate to a new blade may be based on whether a powered down blade exists and can be powered up, and whether the resources of the powered down blade as sufficient to satisfy the migration criteria for the selected virtual machines.

If a determination is made to migrate virtual machines to a new blade, then a blade is powered up in step 962. Powering up the blade may be performed using techniques known in the art. In step 966, the selected virtual machines are migrated to the powered up blade. Migrating the selected virtual machines may be performed as discussed above.

FIG. 10 shows a flowchart of a method for migrating virtual machines based on a time based migration policy. In step 1000, the time is monitored. In step 1002, a determination is made whether to trigger a time-based migration. Triggering a time-based migration is based on whether the current time matches a time in the time based migration policy. If a determination is made not to trigger a time based migration, then monitoring the time is continued in step 1000.

Alternatively, if a determination is made to trigger a time based migration, then a determination is made whether to expand the number of blades in use (i.e., powered up) in step 1004. Specifically, a determination is made whether the time-based migration policy indicates that the number of blades should be expanded. If a determination is made to expand the number of blades in use, then a new blade is powered up in step 1006. Powering up a new blade may be performed using techniques known in the art.

In step 1008, virtual machines to migrate to the new blade are selected. In one or more embodiments of the invention, the virtual machines are selected based on migration criteria for each virtual machine and/or to achieve load balancing across the blades in the blade chassis. In step 1010, virtual machines are migrated to the new blade. Migrating the virtual machines may be performed as discussed above.

Alternatively, if in step 1004, a determination is made not to expand the number of blades in use, then the number of blades in use is coalesced according to the time based migration policy. Specifically, the migration policy indicates that the number of blades should be reduced. Accordingly, a blade to power down is selected in step 1012. Selecting the blade to power down may be based on load balancing, the current resource usage for each blade and other such criteria. For example, the blade that is selected may be the blade that has the least number of virtual machines executing on the blade. In step 1014, virtual machines are migrated from the selected blade and the blade is powered down in step 1016. Migrating virtual machines and powering down the blade may be performed as discussed above.

FIGS. 11A-11C show an example of migrating a virtual machine in accordance with one or more embodiments of the invention. FIGS. 11A-11C are provided as examples only, and should not be construed as limiting the scope of the invention.

Referring to FIG. 11A, consider the scenario in which the system includes three blades (1100, 1102, 1104) connected to the chassis interconnect (not shown) in a blade chassis (not shown). The system is initially configured such that Blade A (1100) includes Host A (1106), Blade B (1102) includes Host B (1108) and Blade C (1104) includes Host C (1110).

As shown in FIG. 11A, Host A (1106) includes VNIC A (1122) associated with VM A (1112) and VNIC B (1124) associated with VM B (1114). Further, Host B (1108) includes VNIC C1 (1126) and VNIC C2 (1128) both associated with VM C (1116). Finally, Host C (1110) includes VNIC D (1130) associated with VM D (1118) and VNIC E (1132) associated with VM E (1120).

As shown in FIG. 11A, VM A (1112) communicates with VM E (1120) using virtual wire (VW) A (1136) with a bandwidth limit of 5 gigabits per second (GBPS). VW A (1136) connects VNIC A (1122) with VNIC E (1132). Further, VM B (1114) communicates with VM C (1116) using VW B (1134) with a bandwidth limit of 3 GBPS. VW B (1134) connects VNIC B (1124) with VNIC C1 (1126). Finally, VM C (1116) communicates with VM D (1118) using VW C2 (1136) with a bandwidth limit of 8 GBPS. VW C2 (1136) connects VNIC C2 (1128) with VNIC D (1130). Each of the VWs is associated with the priority. The priority of the VWs in FIG. 11A from highest to lowest is: VW B (1134), VW C2 (1136), and VW A (1138).

After system has been configured as described above and shown in FIG. 11A, the resource usage data is monitored for each blade (1100, 1102, 1104). The resource usage data indicates that blade B (1102) is using only 10% of the resources. Accordingly, the coalesce migration policy indicates to power down blade B (1102). As such, VM C (1116) must be migrated to another host.

The control OS then sends a request including the migration criteria to the hosts in the blade chassis (i.e., Host A (1108) and Host C (1110)). The migration criteria indicates the amount of resources required by VM C (1116). Host C (1110) responds that Host C (1110) is using only 60% of the resources, accordingly, Host C (1110) has sufficient resources. At this stage, the control OS selects Host C (1110) as the target host. The control OS then initiates the migration of VM C (1116) along with VNIC C1 (1126) and VNIC C2 (1128) to Host C (1110) in accordance with Steps 712-726. Once the migration is complete, Blade B (1120) is powered down as shown in FIG. 11B. As shown in FIG. 11B, the VWs are preserved across the migration. However, because VNIC C2 (1128) and VNIC D (1130) are now located on Host C (1118), virtual switch (VS) C2 (1137) instead of VW C2 (1136) is used to connect VNIC C2 (1128) and VNIC D (1130).

Referring to FIG. 11C, consider the scenario in which the system shown in FIG. 11A is subject to a time-based migration policy and that the current time is 6:00 pm. The time-based migration policy indicates that only two blades should be executing at 6:00 pm. The control OS may select blade B (1102) to power down. As such, VM C (1116) must be migrated to another host.

The control OS then sends a request including the migration criteria to the hosts in the blade chassis (i.e., Host A (1108) and Host C (1110)). The migration criteria indicate the amount of resources required by VM C (1116). In accordance with FIGS. 7A and 7B, the control OS (not shown) determines the migration criteria for VM C (1116). The migration criteria include a bandwidth constraint (i.e., 11 GBPS). The control OS then sends a request including the migration criteria to the hosts in the blade chassis (i.e., Host A (1108) and Host C (1110)). Both Host A (1108) and Host C (1110) respond that they do not have sufficient resources to satisfy the migration criteria. At this stage, the control OS, pursuant to FIG. 7B, identifies the lowest priority active VW (i.e., VW A). VW A (1138) is subsequently suspended. Suspending VW A (1138) includes suspending VM A (1112), VNIC A (1122), VM E (1120), and VNIC E (1132)

The control OS then resends the request include the migration criteria to the hosts in the blade chassis (i.e., Host A (1108) and Host C (1110)). Host A (1106) responds that it does not have sufficient resources to satisfy the migration criteria. Host C (1110) responds that it has sufficient resources to satisfy the migration criteria. At this stage, the control OS selects Host C (1110) as the target host.

The control OS then initiates the migration of VM C (1116) along with VNIC C1 (1126) and VNIC C2 (1128) to Host C (1110) in accordance with Steps 712-726. Once the migration is complete, Blade B (1120) is powered down. The result of the migration is shown in FIG. 11C. As shown in FIG. 11C, the VWs are preserved across the migration. However, because VNIC C2 (1128) and VNIC D (1130) are now located on Host C (1118), virtual switch (VS) C2 (1137) instead of VW C2 (1136) is used to connect VNIC C2 (1128) and VNIC D (1130).

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for power management, comprising:
   triggering a first migration based on a first current time matching a first time specified in a migration policy, wherein the migration policy defines when to condense the number of blades operating on a blade chassis;
   selecting a first blade to power down based on the triggering of the first migration;
   migrating each virtual machine (VM) executing on the first blade to a second blade based on the triggering of the first migration, wherein migrating comprises:
      obtaining migration criteria for a first virtual machine (VM) executing on the first blade,
         wherein the first VM is located on a first blade in a blade chassis,
         wherein the first VM is associated with a first virtual network interface (VNIC),
         wherein the first VNIC is connected to a second VNIC on a third blade in the blade chassis using a first virtual wire having a first priority,
         wherein the third blade comprises a second VM associated with the second VNIC and a third VM associated with a third VNIC, and
         wherein the third VNIC is connected to a fourth VNIC on the second blade in the blade chassis using a second virtual wire having a second priority,
      sending a request comprising the migration criteria to the second blade in the blade chassis,
      receiving a response to the request from the second blade, wherein response indicates that the second blade cannot satisfy the migration criteria;
      suspending the second virtual wire based on the first priority being higher than the second priority;
      suspending execution of the first VM on the first blade and obtaining information to migrate the first VM;
      obtaining information required to migrate the first VNIC; and
   migrating the first VM and the first VNIC to the second blade using the information required to migrate the first VM and the information required to migrate the first VNIC; and
   powering down the first blade after each VM executing on the first blade is migrated from the first blade.

2. The method of claim 1, further comprising:
   triggering a second migration based on a second current time matching a second time specified in the migration policy, wherein the migration policy further defines when to expand the number of blades operating on the blade chassis;
   selecting a fourth blade to power up based on the triggering of the second migration;
   powering up the fourth blade after triggering the second migration;
   selecting a set of virtual machines executing on the second blade to migrate to the fourth blade based on the second migration policy;
   migrating the set of virtual machines to the fourth blade.

3. The method of claim 1, wherein the migration criteria is a bandwidth constraint for the first VM.

4. The method of claim 1, wherein the migrating further comprises:
   configuring the first VNIC and the first VM to satisfy the migration criteria;
   updating a virtual switching table in the blade chassis to reflect the migration of the first VM from the first blade to the second blade; and
   resuming execution of the first VM on the second blade.

5. A non-transitory computer readable medium comprising computer readable program code embodied therein for causing a computer system to perform a method for power management, the method comprising:
   triggering a first migration based on a first current time matching a first time specified in a migration policy, wherein the migration policy defines when to condense the number of blades operating on a blade chassis;
   selecting a first blade to power down based on the triggering of the first migration;
   migrating each virtual machine (VM) executing on the first blade to a second blade based on the triggering of the first migration, wherein migrating comprises:
      obtaining migration criteria for a first virtual machine (VM) executing on the first blade,
         wherein the first VM is located on a first blade in a blade chassis,
         wherein the first VM is associated with a first virtual network interface (VNIC),
         wherein the first VNIC is connected to a second VNIC on a third blade in the blade chassis using a first virtual wire having a first priority,
         wherein the third blade comprises a second VM associated with the second VNIC and a third VM associated with a third VNIC, and
         wherein the third VNIC is connected to a fourth VNIC on the second blade in the blade chassis using a second virtual wire having a second priority,
      sending a request comprising the migration criteria to the second blade in the blade chassis,
      receiving a response to the request from the second blade, wherein response indicates that the second blade cannot satisfy the migration criteria;
      suspending the second virtual wire based on the first priority being higher than the second priority;
      suspending execution of the first VM on the first blade and obtaining information to migrate the first VM;
      obtaining information required to migrate the first VNIC; and
   migrating the first VM and the first VNIC to the second blade using the information required to migrate the first VM and the information required to migrate the first VNIC; and
   powering down the first blade after each VM executing on the first blade is migrated from the first blade.

6. The non-transitory computer readable medium of claim 5, wherein the method further comprises:
   triggering a second migration based on a second current time matching a second time specified in the migration policy, wherein the migration policy further defines when to expand the number of blades operating on the blade chassis;
   selecting a fourth blade to power up based on the triggering of the second migration;
   powering up the fourth blade after triggering the second migration;
   selecting a set of virtual machines executing on the second blade to migrate to the fourth blade based on the second migration policy;
   migrating the set of virtual machines to the fourth blade.

7. The non-transitory computer readable medium of claim 5, wherein the migration criteria is a bandwidth constraint for the first VM.

8. The non-transitory computer readable medium of claim 5, wherein the migrating further comprises:
   configuring the first VNIC and the first VM to satisfy the migration criteria;
   updating a virtual switching table in the blade chassis to reflect the migration of the first VM from the first blade to the second blade; and
   resuming execution of the first VM on the second blade.

* * * * *